(12) United States Patent  
Zahl (10) Patent No.: US 12,540,966 B2  
(45) Date of Patent: Feb. 3, 2026

(54) SYSTEM AND METHOD FOR CONTROLLING REFRIGERATION LOOP EXPANSION VALVE FLOW AND COMPRESSOR SPEED UNDER CONDITIONS OF RAPID HEAT LOAD CHANGES

(71) Applicant: LTI Holdings, Inc., Pleasanton, CA (US)

(72) Inventor: Eric Zahl, Saint Helens, OR (US)

(73) Assignee: LTI Holdings, Inc., Pleasanton, CA (US)

( * ) Notice: Subject to any disclaimer, the term of this patent is extended or adjusted under 35 U.S.C. 154(b) by 3 days.

(21) Appl. No.: 18/100,467

(22) Filed: Jan. 23, 2023

(65) Prior Publication Data

US 2023/0236242 A1 Jul. 27, 2023

Related U.S. Application Data

(60) Provisional application No. 63/302,495, filed on Jan. 24, 2022.

(51) Int. Cl.  
*G01R 31/28* (2006.01)

(52) U.S. Cl.  
CPC .. *G01R 31/2877* (2013.01); *F25B 2600/0253* (2013.01); *F25B 2600/2513* (2013.01)

(58) Field of Classification Search  
CPC ................. F25B 2600/0253; F25B 2600/2513  
See application file for complete search history.

(56) References Cited

U.S. PATENT DOCUMENTS

| | | | |
|---|---|---|---|
| 2003/0217558 A1* | 11/2003 | Wall | F25B 41/347 62/223 |
| 2016/0238284 A1* | 8/2016 | Krystad | F25B 49/022 |
| 2021/0239375 A1 | 8/2021 | Kim et al. | |

* cited by examiner

*Primary Examiner* — Nael N Babaa  
(74) *Attorney, Agent, or Firm* — Ice Miller LLP (57) ABSTRACT

A hybrid controller for a thermal control unit for controlling the temperature of a device under test (DUT) is described that uses information from an in independent heat-injecting control loop as a fast-responding proxy for relative changes in DUT test head load. This information provides additional feedback to the refrigeration sub-system's controller(s), resulting in achieving the overall system goal of temperature control of the DUT over a wide range of set point temperatures and the rapidly changing DUT head load.

20 Claims, 9 Drawing Sheets  
(1 of 9 Drawing Sheet(s) Filed in Color)

SYSTEM AND METHOD FOR CONTROLLING REFRIGERATION LOOP EXPANSION VALVE FLOW AND COMPRESSOR SPEED UNDER CONDITIONS OF RAPID HEAT LOAD CHANGES

CROSS-REFERENCE TO RELATED APPLICATIONS

This application claims the benefit of U.S. Provisional Application No. 63/302,495, filed on Jan. 24, 2022 entitled CONTROLLING REFRIGERATION LOOP EXPANSION VALUE FLOW AND COMPRESSOR SPEED UNDER CONDITIONS OF RAPID HEAT LOAD CHANGES, which is hereby incorporated by reference in its entirety.

TECHNICAL FIELD OF THE DISCLOSED EMBODIMENTS

The presently disclosed embodiments generally relate to systems and methods for maintaining a setpoint temperature of a device under test and, more particularly, to systems and methods for controlling refrigeration loop expansion valve flow and compressor speed under conditions of rapid heat load changes.

BACKGROUND

An electronic device, such as an integrated circuit (IC), may undergo various forms of testing to ensure the reliability, suitability, and capability of the device to operate in the intended manner under expected operating conditions, such as a range of environmental temperature conditions. Such testing may include controlling temperature conditions of the device under test (DUT) to cover the expected or design environmental range of temperatures. Various devices and methods have been developed to control the temperature of a DUT to simulate design environmental temperature conditions for the DUT.

A Thermal Control Unit (TCU) is an example of a device that is used to maintain set point temperature of a controlled sensor temperature at the surface of, or within a DUT when the DUT is placed on the test head of the TCU. The controlled sensor temperature is affected by the TCU's test head surface temperature. The controlled sensor temperature must be maintained in the presence of unknown and rapidly changing heat production from the DUT, which is thermally conductively interfaced to the TCU test head.

In a particular embodiment, a TCU may have a refrigeration system with a variable expansion valve and a variable compressor speed. To control the expansion valve flow and the compressor speed, a typical refrigeration system may use sensors within the refrigeration loop as feedback to the valve controller and compressor controllers when either or both of these components support variable control. In a system having the goal of controlling temperature of a DUT experiencing rapid and large heat production changes (changes in heat load to the TCU), utilizing the sensors within the refrigeration loop as the only feedback to the controllers may result in relatively slow but stable changes to the refrigeration sub-systems' cooling capacity. This typical refrigeration control response results in periods where the overall system goal of controlling DUT temperature is limited in speed of response to dynamic heat load changes in the DUT. Improvements to such systems are therefore needed.

SUMMARY OF THE DISCLOSED EMBODIMENTS

According to embodiments of the present disclosure, a hybrid controller is described that uses information from an in independent heat-injecting control loop as a fast-responding proxy for relative changes in DUT test head load. This information provides additional feedback to the refrigeration sub-system's controller(s), resulting in achieving the overall system goal of temperature control of the DUT over a wide range of set point temperatures and the rapidly changing DUT head load.

As will be explained further below, using the additional refrigeration sub-system feedback may be used to produce unusually fast changes in refrigeration control as a response to rapidly changing DUT heat load. This control response may be bounded and consistent for similar relative changes in DUT heat load and may operate seamlessly, without special cases—shifting between net cooling and net heating conditions. Over traditional systems, the hybrid controller described in the present disclosure may offer lower production cost, lower system complexity, and higher performance consistently, all while eliminating detracting field preventative maintenance requirements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DISCLOSURE OF THE VARIOUS EMBODIMENTS

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

Figure 1:
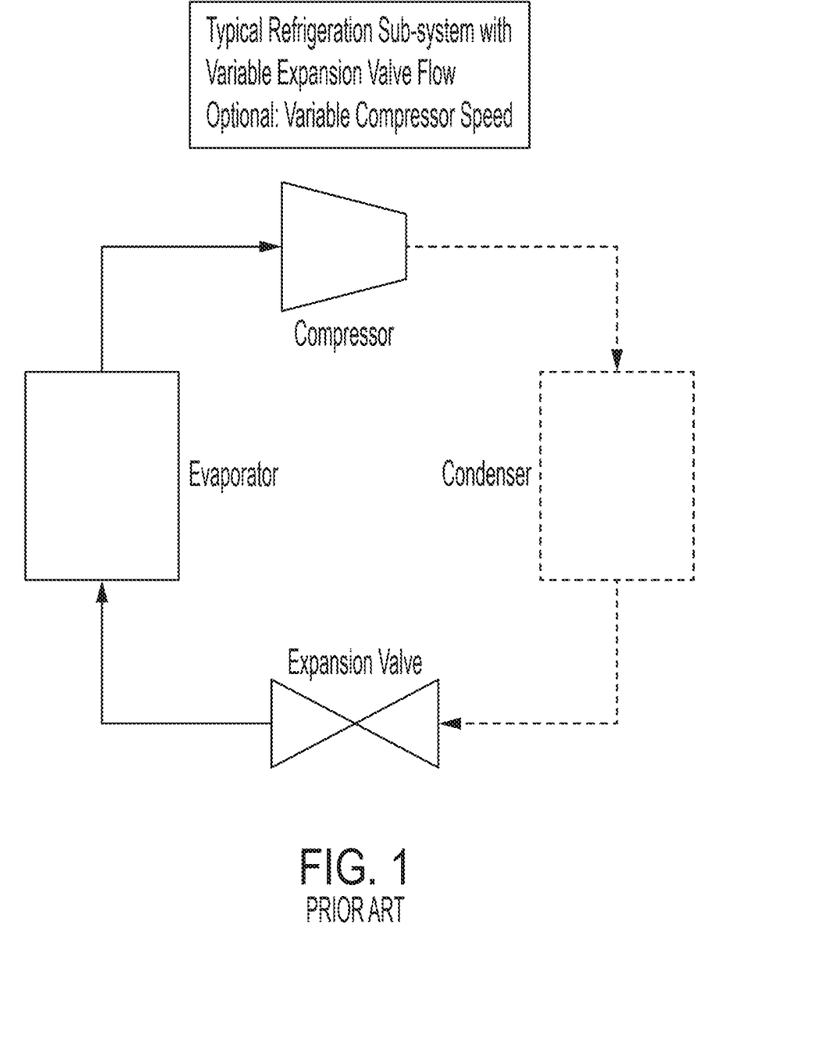
FIG. 1 is a schematic block diagram of a prior art refrigeration sub-system with variable expansion valve flow and optional variable compressor speed.

Exemplary methods, apparatuses, and computer program products controlling refrigeration loop expansion valve flow and compressor speed under conditions of rapid heat load changes in accordance with the present disclosure are described with reference to the accompanying drawings, beginning with FIG. 1. FIG. 1 illustrates a block diagram of a typical refrigeration sub-system with variable expansion valve flow and optional variable compressor speed.

A basic refrigeration cycle consists of four major elements: a compressor, a condenser, a metering device, such as a thermal expansion valve, and an evaporator. As a refrigerant passes through a circuit containing these four elements, a cooling effect occurs. The cycle starts when refrigerant enters the compressor in a low-pressure, moderate-temperature, gaseous form. The refrigerant is compressed by the compressor to a high-pressure and high-temperature gaseous state. The high-pressure and high-temperature gas then enters the condenser. The condenser cools the high-pressure and high-temperature gas allowing it to condense to a high-pressure liquid by transferring heat to a lower temperature medium, usually ambient air.

In order to produce a cooling effect from the higher pressure liquid, the flow of refrigerant entering the evaporator is restricted by the expansion valve, reducing the pressure and allowing isenthalpic expansion back into the vapor phase to take place at a lower temperature. The expansion valve may have a sensing bulb that is filled with a liquid whose thermodynamic properties are similar to those of the refrigerant. This bulb is thermally connected to the output of the evaporator so that the temperature of the refrigerant that leaves the evaporator can be sensed. The gas pressure in the sensing bulb provides the force to open the expansion valve, therefore dynamically adjusting the flow of refrigerant inside the evaporator and, as a result, the superheat that is acquired by the refrigerant that exits the evaporator. Other types of expansion valves may also be used.

The superheat is the excess temperature of the vapor above its boiling point at the evaporating pressure. No superheat indicates that the refrigerant is not being fully vaporized within the evaporator and liquid may end up being recirculated to the compressor. On the other hand, excessive superheat indicates that there is insufficient refrigerant flowing through the evaporator coil, and thus a large portion of it does not contain any liquid refrigerant to evaporate and is not providing significant cooling in that portion. Therefore, by regulating the superheat to a small value, typically only a few ° C., the heat transfer of the evaporator will be near optimal, without excess saturated refrigerant being returned to the compressor.

Figure 2:
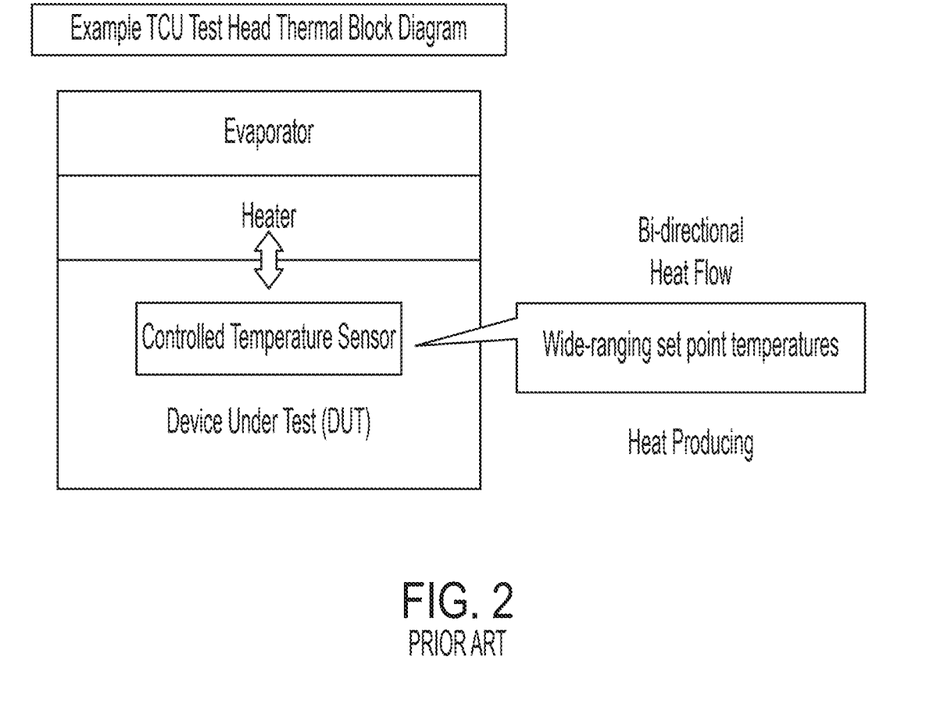
FIG. 2 is a schematic block diagram of a prior art thermal control unit test head with a device under test thermally connected thereto.

For further explanation, FIG. 2 illustrates an example TCU test head thermal block diagram. The DUT is thermally conductively coupled to the test head, and bi-directional heat flow may occur between the DUT and the system's heater and evaporator. A controlled temperature sensor is thermally conductively coupled to the test head and supplies a sensed temperature value to the TCU controllers. The heater and the evaporator are operated under the control of the TCU controllers to maintain any of a wide variety of set point temperatures at the test head over a wide range of DUT-produced heat loads.

Figure 3:
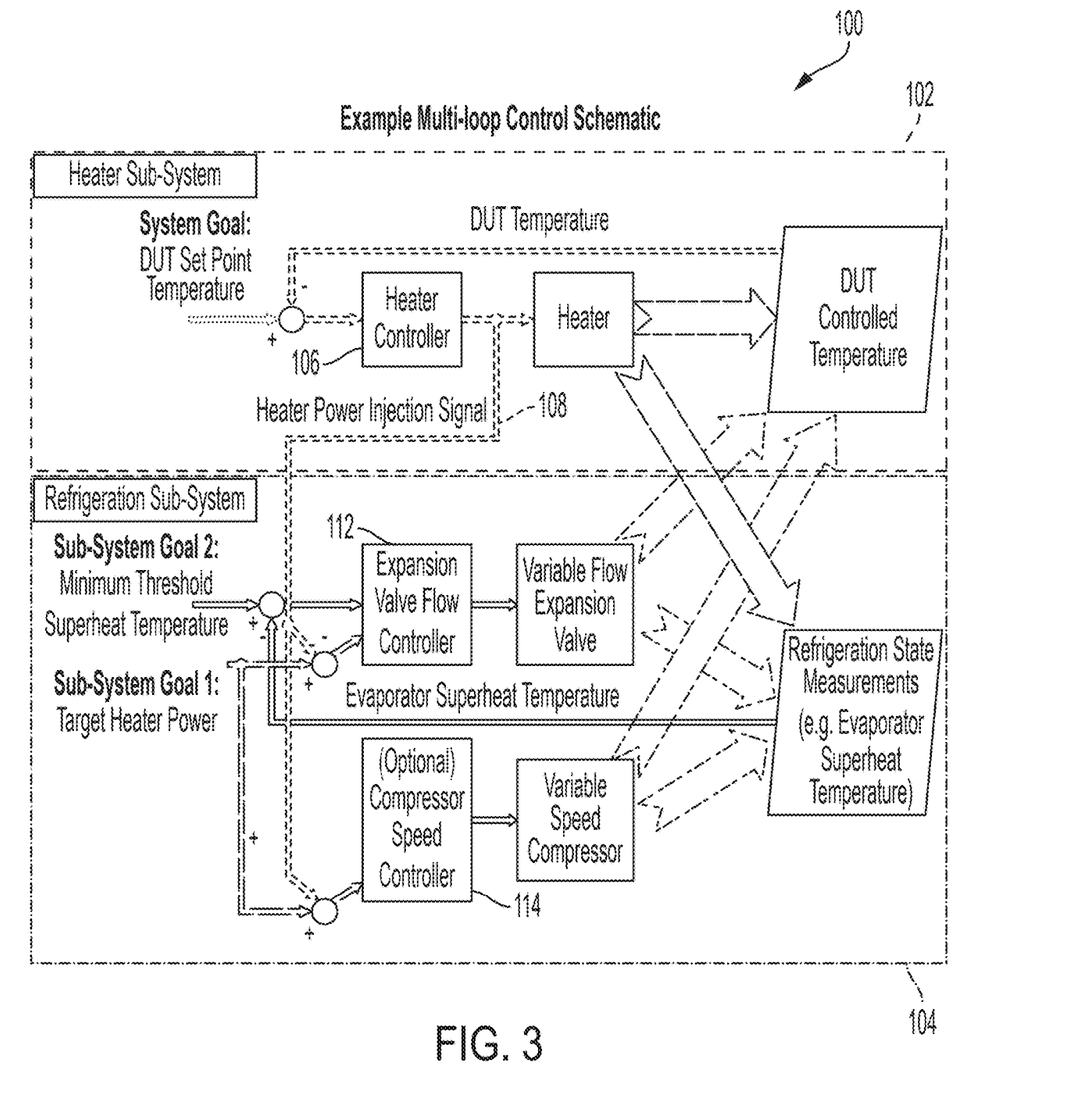
FIG. 3 is a schematic diagram of an embodiment of a multi-loop control system according to the present disclosure.

FIG. 3 schematically illustrates one embodiment of a multi-loop control system 100 that includes a heater sub-system 102 and a refrigeration sub-system 104. In the embodiment of FIG. 3, the heater controller 106 of the heater sub-system 102 controls injected heater power to the TCU test head. The heater controller 106 has the same goal as the overall TCU system goal: to control the DUT controlled temperature. In this example, the heater controller 106 produces a heater injection signal 108 indicating the amount of heat to add via direct heaters thermally conductively coupled to the TCU test head. The input to the heater controller 106 includes the difference between the DUT set point temperature and the sensed controlled temperature of the DUT. The heater controller 106 does not directly use any sensor input from the refrigeration sub-system 104. However, the heater controller 106 is indirectly influenced by the refrigeration sub-system 104 in that the DUT sensed controlled temperature is affected by the refrigeration sub-system 104. The heater controller 106 is able to estimate relative DUT heat load changes quickly via its changes to the heater injection signal 108 required to attempt to maintain DUT controlled temperature.

Figure 4:
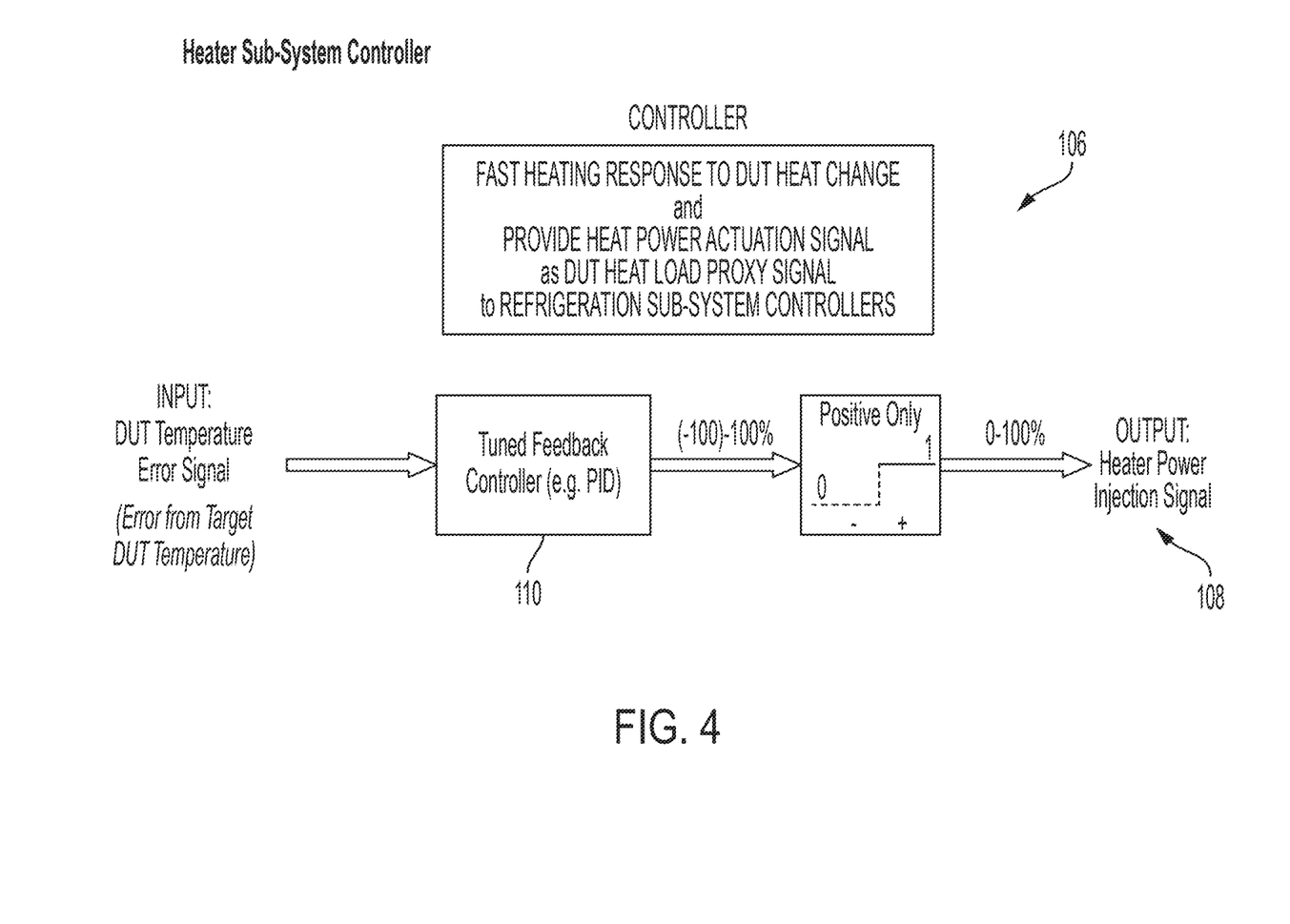
FIG. 4 is a schematic block diagram of an embodiment of a heater controller of the multi-loop control system of FIG. 3.

One embodiment of a heater controller 106 is illustrated schematically in FIG. 4. The heater controller 106 utilizes a tuned feedback controller, such as a proportional-integral-derivative (PID) controller 110, to name just one non-limiting example. In one embodiment, the heater injection signal may be a signal that controls the duty cycle of the heater.

The refrigeration sub-system 104 does not have the overall TCU system set point temperature, but is indirectly guided to rapidly adjusting the cooling of the TCU test head to assist the heater controller 106 to do so over a wide range of DUT heat loads. In the example of FIG. 3, the refrigeration sub-system 104 includes an expansion valve flow controller 112 that controls flow of liquid refrigerant to the expansion valve. The expansion valve flow controller 112 includes unconventional input, which is the error of the heater injection signal 108 (determined by the heater controller 106) compared to a nominal (target) heater injection signal state (for example, 25% heater). The nominal heater injection can be chosen to balance overall TCU system power usage with the range of DUT heat load change to support.

In one embodiment, one unconventional part of the expansion valve flow controller 112 algorithm is to adjust the expansion valve flow to attempt to obtain a nominal heater injection signal by the heater controller 106. The expansion valve flow controller 112 may also include conventional input, which is the error of the nominal refrigerant state to the measured refrigerant state (e.g., evaporator superheat temperature). This can be used as a check to modify the final controller output to ensure that the expansion valve flow controller 112 is not driving the refrigeration sub-system 104 into an undesirable state where liquid refrigerant could be forming at the compressor suction line. However, using this input alone for the expansion valve flow controller 112 algorithm would result in a refrigeration sub-system 104 response which is slower to respond to DUT heat changes than desired.

Figure 5:
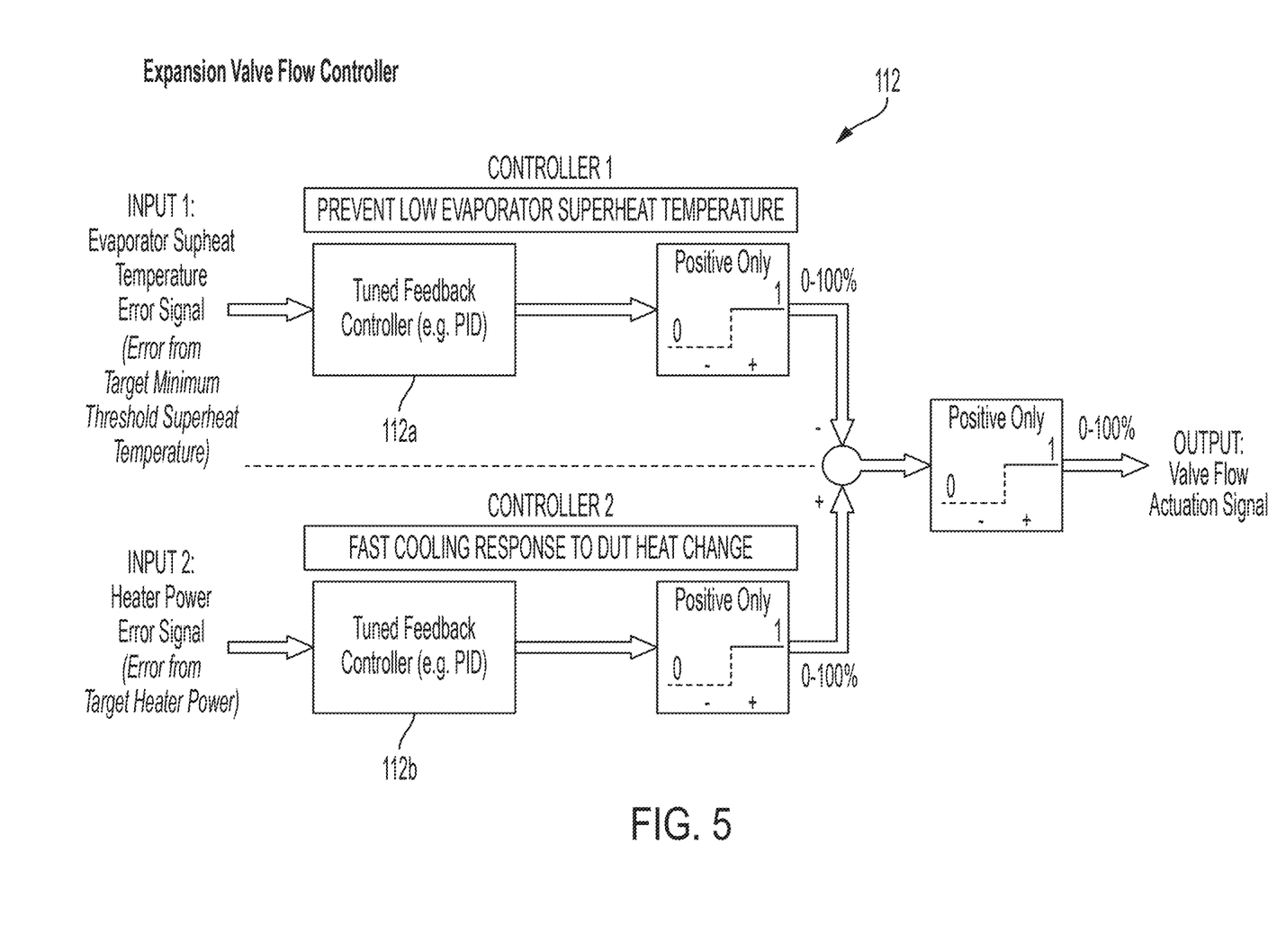
FIG. 5 is a schematic block diagram of an embodiment of an expansion valve flow controller of the multi-loop control system of FIG. 3.

One embodiment of an expansion valve flow controller 112 is illustrated schematically in FIG. 5. The expansion valve flow controller 112 utilizes two tuned feedback controllers 112a and 112b, such as proportional-integral-derivative (PID) controllers, to name just one non-limiting example. In one embodiment, the output of the expansion valve flow controller 112 is a valve flow actuation signal, may be a signal that controls the variable flow expansion valve.

In the example of FIG. 3, the refrigeration sub-system 104 includes an optional compressor speed controller 114 that controls the speed of the compressor. Like the expansion valve flow controller 112, the compressor speed controller 114 also has the unconventional input, which is the error of the heater injection signal 108 (determined by the heater controller 106) compared to a nominal (target) heater injection signal state (for example, 25% heater, to name just one non-limiting example). Because the optional compressor speed controller 114 is operating independently of the expansion valve flow controller 112 but has the same goal at least for part of the time, there is likelihood of oscillations caused by the competing controllers 112,114. To avoid this, the compressor speed controller 114 can be made the less dominate controller in some embodiments through filtering or tuning so that is has a slower response compared to the expansion valve flow controller 112.

Figure 6:
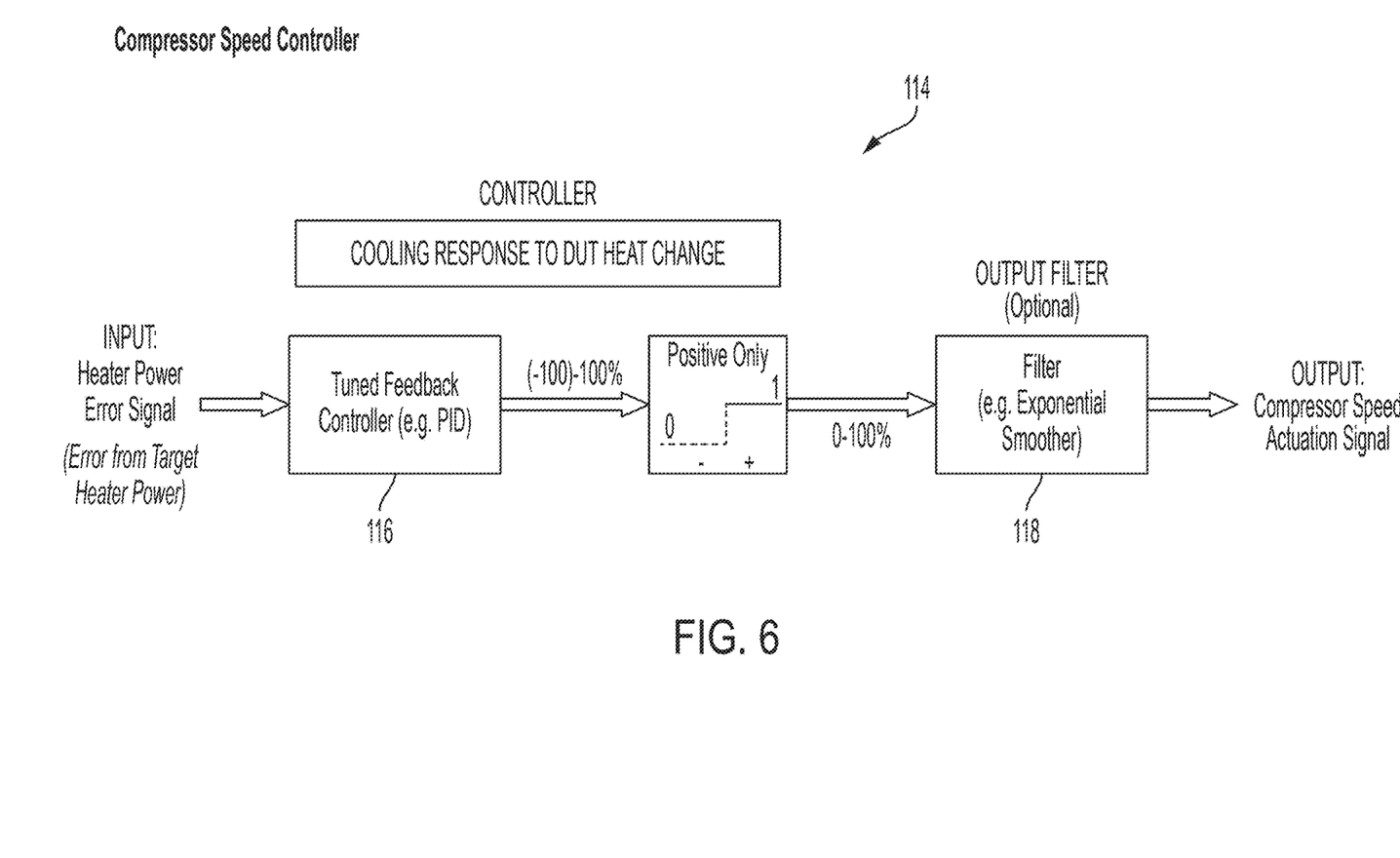
FIG. 6 is a schematic block diagram of an embodiment of a compressor speed controller of the multi-loop control system of FIG. 3.

One embodiment of a compressor speed controller 114 is illustrated schematically in FIG. 6. The compressor speed controller 114 utilizes a tuned feedback controller, such as a proportional-integral-derivative (PID) controller 116, to name just one non-limiting example. The compressor speed controller 114 includes an output filter in some embodiments, such as the filter 118, such as an exponential smoother, to name just one non-limiting embodiment. In one embodiment, the output of the compressor speed controller 114 may be a signal that controls the speed of the variable speed compressor.

In this example, changes in DUT test head load can be more quickly determined by relying on this independent control loop which forces heaters to control the DUT controlled sensor temperature. Changes in that independent loop attempting to maintain set point temperature is a proxy for DUT test head load relative to the current state of refrigeration cooling system capacity. As explained above, traditional refrigeration sub-system controller(s) (expansion valve flow controller, optionally compressor speed controller) only use feedback from refrigeration loop state measurements. By providing additional feedback information to these controllers, a hybrid refrigeration controller is realized resulting in more rapid adjustment of the refrigeration system's expansion valve flow, and optionally compressor speed, to be able to respond to large changes in DUT heat load. This hybrid controller 100 enables better performance of the overall system goal: DUT controlled sensor temperature in the presence of rapidly changing DUT heat production.

In a particular embodiment, this control method consumes more power than a traditional refrigeration system controller, due to the additional heat that must be forced to the test head to use the above-mentioned proxy to determine the DUT heat load. This approach is counter-intuitive in TCU design since adding heat during a net cooling operation is not a system design goal. However, the benefit of this approach is better DUT temperature control performance at the cost of system power consumption.

Figure 7:
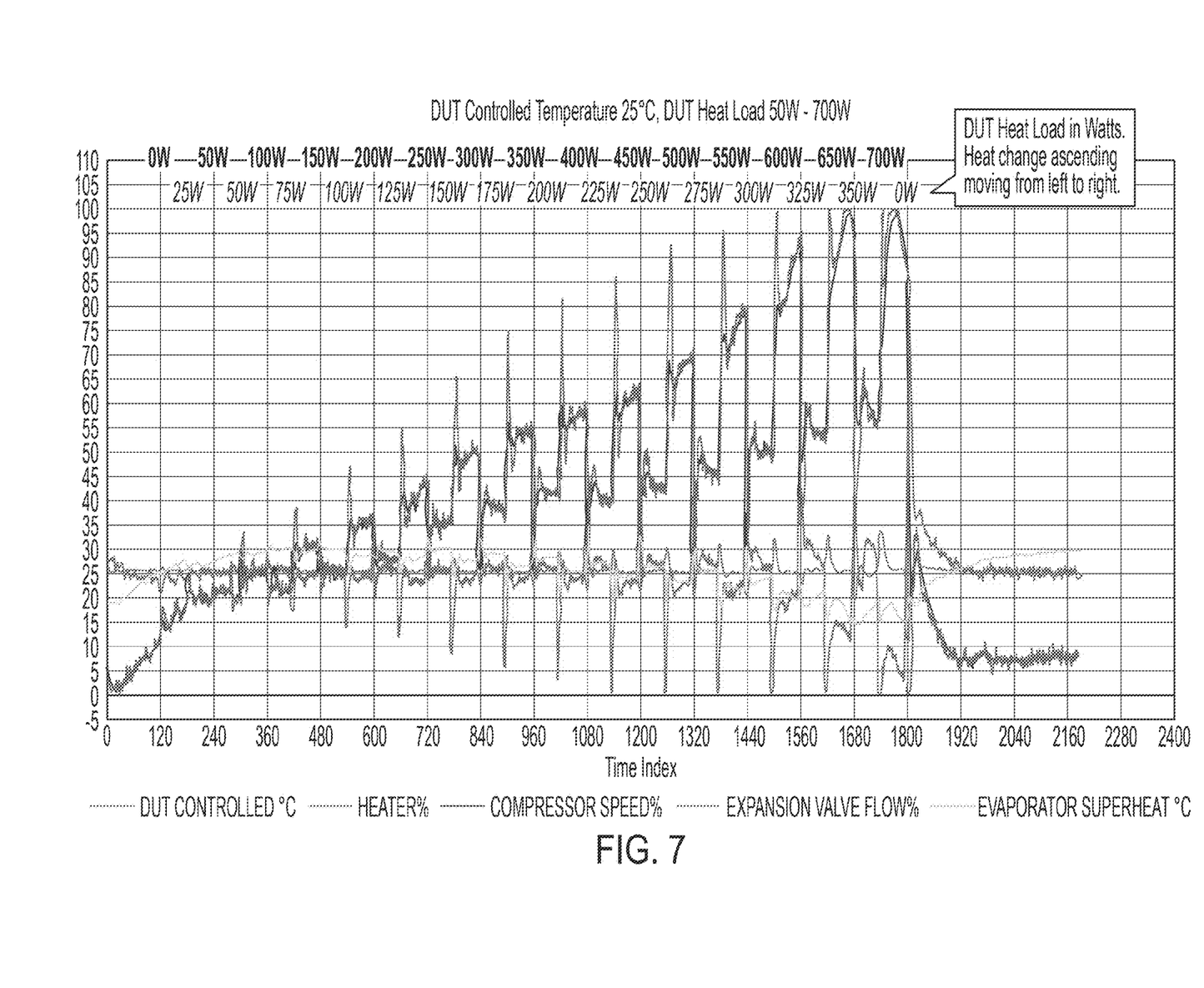
FIG. 7 is a chart of DUT controlled temperature, heater percent, compressor speed percent, expansion valve flow percent and evaporator superheat temperature versus time with changing DUT heat load when using an embodiment of the multi-loop control system according to the present disclosure.

For further explanation, FIG. 7 illustrates a graph of test data demonstrating rapid changes in expansion valve flow as a reaction to rapid changes in DUT heat load. In the example of FIG. 7, the heater controller, the expansion valve flow controller, and the compressor speed controller coordinate effects to restore DUT controller temperature to the overall TCU goal setting of 25 degrees Celsius in the presence of rapid changes in DUT heat load.

Figure 8:
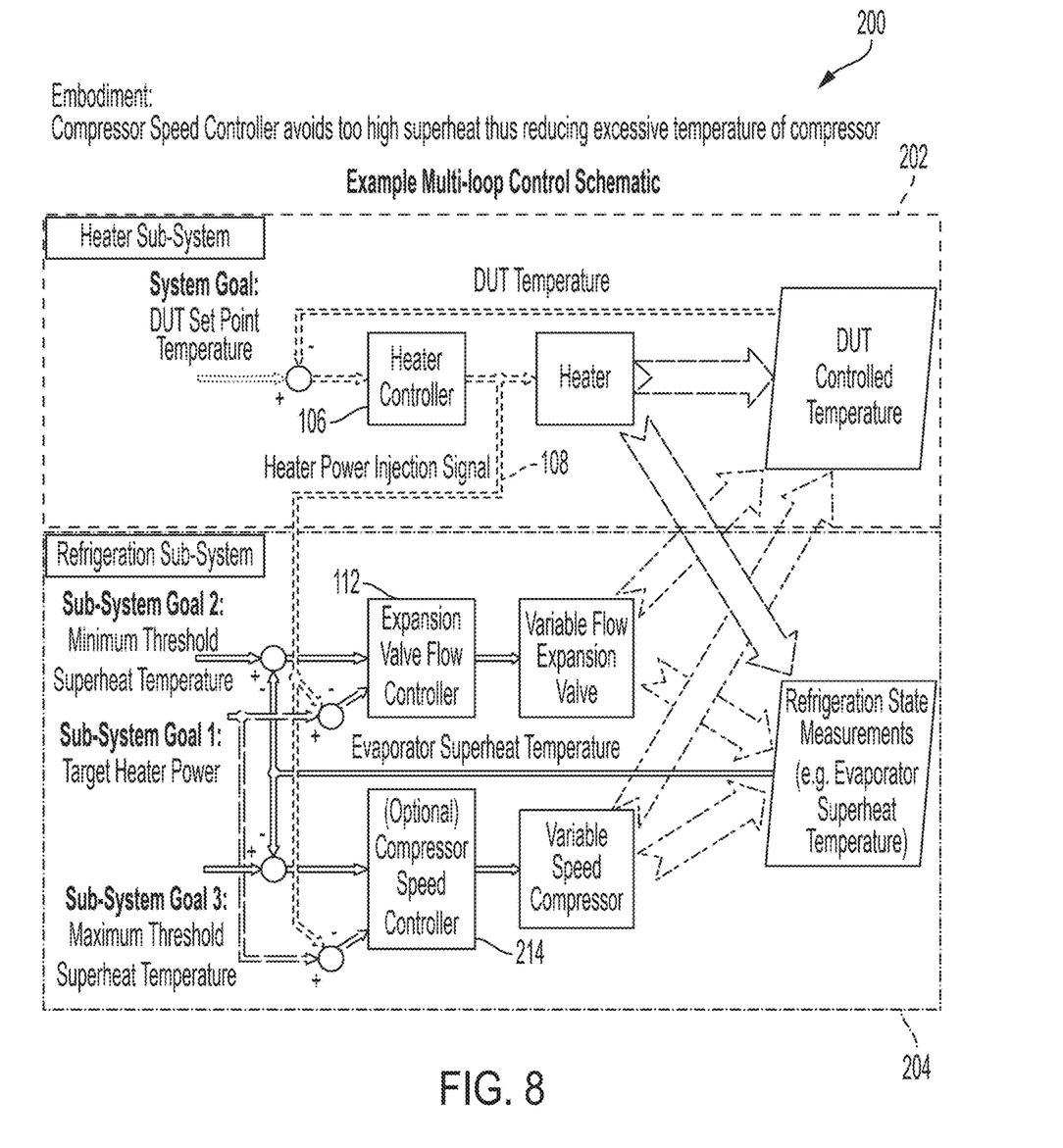
FIG. 8 is a schematic diagram of an embodiment of a multi-loop control system according to the present disclosure.

Another embodiment of the multi-loop control system is schematically illustrated in FIG. 8 and indicated generally at 200. The control system includes a heater subsystem 102 that is identical to the heater subsystem 102 of FIG. 3. The control system of FIG. 8 also includes a refrigeration sub-system 204 which includes an option compressor speed controller 214 that avoids too high a value of superheat, thus reducing excessive temperature of the compressor.

The refrigeration sub-system 204 compressor speed controller 214 has two inputs. The first input is an evaporator superheat temperature error signal (Evaporator Superheat Temperature-Target Maximum Threshold Superheat Temperature), where the Evaporator Superheat Temperature may be estimated by: sensing a temperature near the compressor suction inlet (T suction), sensing a temperature near the evaporator expansion valve outlet (T evap), and performing the calculation: (T superheat)=(T suction)−(T evap); and Target Maximum Threshold Superheat Temperature (T superheat) where going above this value should instigate some corrective control action to attempt to keep (T superheat) from going too far above that value for an extended time. This action serves to correct for the possibility of the second input signal to the compressor speed controller 214 may cause a control response that would increase compressor speed to the point where the refrigeration state could be deleterious to the system—specifically, overheating the compressor due to excessive load.

Figure 9:
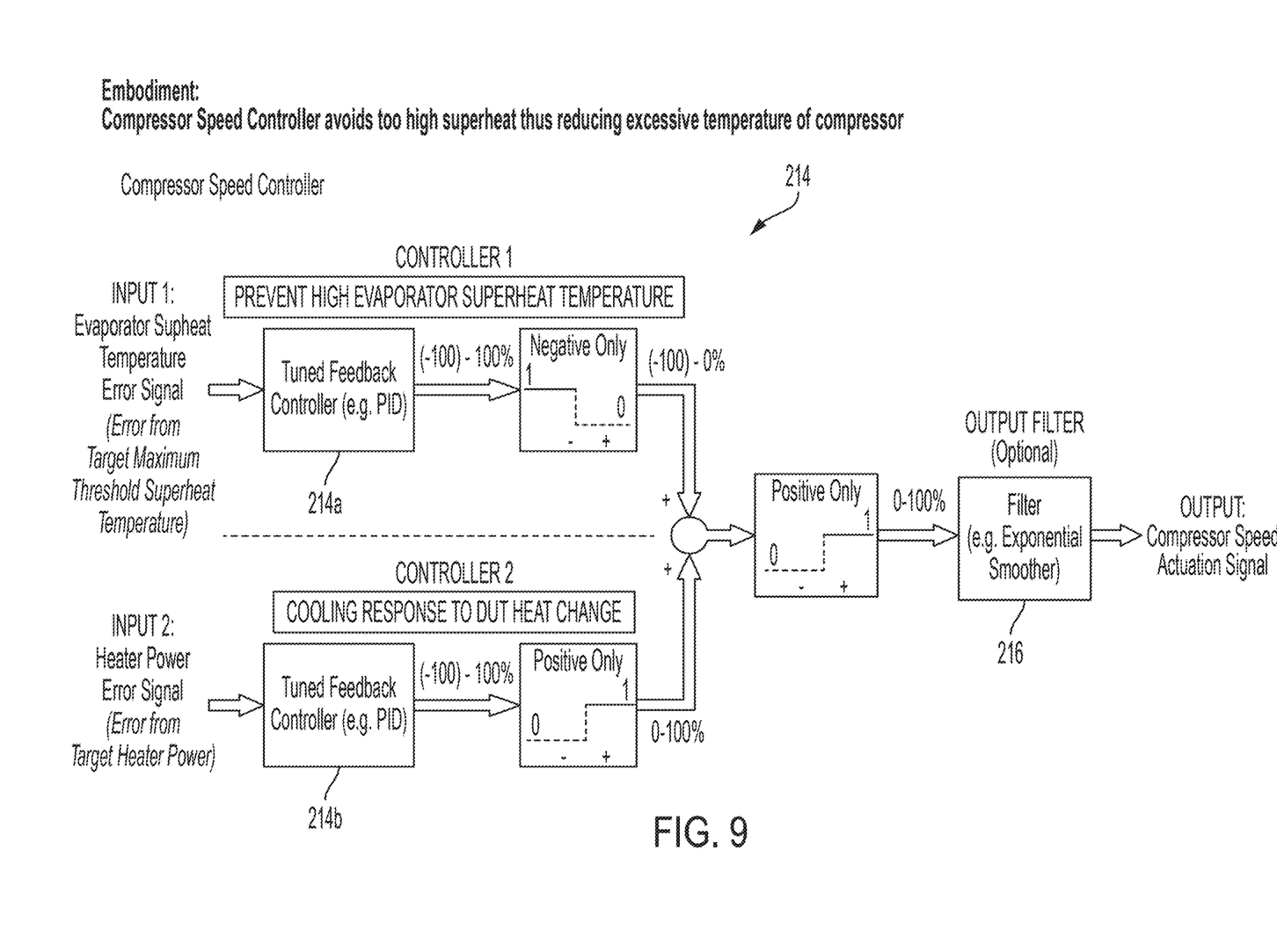
FIG. 9 is a schematic block diagram of an embodiment of a compressor speed controller of the multi-loop control system of FIG. 8.

One embodiment of a compressor speed controller 214 is schematically illustrated in FIG. 9. The compressor speed controller 214 includes a first controller 214a and a second controller 214b. Controller 214a is a feedback controller tuned to provide the desired balance of speed of response, overshoot/undershoot, and stability and lack of oscillation. In some embodiments, the tuning of controller 214a should be performed to have a less aggressive response whereby the action from controller 214a serves as an effective check against controller 214b, avoiding too high a value of evaporator superheat, while minimizing its effect to limit rapid changes in cooling capability afforded by controller 214b whenever it does not result in too high a value of superheat.

The second input to compressor speed controller 214 is the same as the second input to the expansion valve flow controller 112: Heater Power Error Signal=(Heater Power %–Target Heater Power %). The second input is applied to controller 214b, a feedback controller tuned to provide the desired balance of speed of response, overshoot/undershoot, and stability and lack of oscillation. For controller 214b, tuning should be performed to have a response that is fast enough to keep sufficient refrigerant flowing to keep up with changes in expansion valve flow and still be effectively checked by controller 214a to avoid the possibility of deleterious excessive compressor load and related temperature.

The compressor speed controller 214 includes an optional output filter 216 in some embodiments. The effect of the compressor speed controller 214 on refrigeration cooling should be slower acting than the control of expansion valve flow. Therefore, the tuning controller 214b should have a slower response than the expansion valve flow controller 112. Alternatively, the tuning could be more aggressive but have an extra output stage of a filter 216 which could effectively make the response less aggressive in time. This arrangement of a filter 216 (for example an exponential smoother, to name just one non-limiting example) is shown in the block diagram of FIG. 9.

The output of the compressor speed controller 214 is the Compressor Speed Actuation Signal, which determines the active compressor speed setting for the variable speed compressor. This is calculated as the difference of the outputs from controller 214a and controller 214b, whereby controller 214b is the desired response if there was no effect from excessive compressor temperature and has a positive value, and controller 214a serves to effectively monitor and avoid the possible overreaches of controller 214b and has a negative value to counteract controller 214b.

FIG. 9 shows all scaling in %, where for signals that should only be positive the range is 0% to 100%, for signals that should only be negative is range (−100)% to 0%, and for signals that can be negative or positive the range is (−100)% to +100%. For the compressor speed controller 214, 0% signifies the minimum speed suitable for the system (not zero since some compressor speed is always required) and +100% usually signifies the maximum possible compressor speed. Scaling units is not fundamental to a description of this controller but using percent is done here for simplification of explanation. A realized compressor speed controller 214 must match scaling to physical actuation capabilities of the refrigeration subsystem taking into account the minimum compressor speed that must be guaranteed.

In accordance with at least one embodiment of the present disclosure, a refrigeration-based TCU may include the following design features:

Method to control refrigeration systems having variable expansion valve flow and possibly variable compressor speed.

Additional heat load feedback information provided by ancillary heat-injecting control loop.

Resulting in improved overall TCU system control under rapid heat load changes over wide set point temperatures with seamless control of widely different control scenarios (net cooling, net heating).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. An apparatus for controlling a temperature of a device under test, the apparatus comprising:
a heater sub-system that includes a heater controller, the heater controller configured for providing a heater injection signal for controlling a heater;
a refrigeration sub-system that includes an expansion valve flow controller, the expansion valve flow controller configured for controlling, based on an error of the heater injection signal compared to a nominal heater injection signal, a flow of liquid refrigerant to a variable flow expansion valve.

2. The apparatus of claim 1 wherein the refrigeration sub-system includes a compressor speed controller configured for controlling, based on the error of the heater injection signal compared to a nominal heater injection signal, a speed of a compressor.

3. The apparatus of claim 1, wherein the expansion valve flow controller includes a feedback controller configured to receive an additional input from an evaporator superheat temperature sensor.

4. The apparatus of claim 1, wherein the expansion valve flow controller includes a tuned feedback controller configured to regulate refrigerant flow based on the heater injection signal error and a secondary evaporator superheat error signal.

5. The apparatus of claim 4, wherein the tuned feedback controller is a proportional-integral-derivative (PID) controller.

6. The apparatus of claim 1, wherein the compressor speed controller includes an adaptive filter configured to smooth transient fluctuations in compressor speed adjustments based on the heater injection signal error.

7. The apparatus of claim 1, further comprising a compressor suction inlet; wherein the expansion valve flow controller is further configured to prevent liquid refrigerant from reaching the compressor suction inlet by adjusting flow based on a detected superheat threshold.

8. The apparatus of claim 1, wherein the refrigeration expansion valve controller utilizes the heater injection signal to modulate the expansion valve flow such that the heater remains within a controllable operating range.

9. The apparatus of claim 1, wherein the refrigeration sub-system further includes a secondary cooling loop that is activated by the heater injection signal error, providing additional cooling capacity.

10. An apparatus for controlling a temperature of a device under test (DUT), the apparatus comprising:
a heater sub-system including a heater controller, the heater controller configured to generate a heater injection signal to control a heater based on a temperature difference between the DUT and a setpoint temperature;
a refrigeration sub-system including an expansion valve flow controller and a compressor speed controller, the expansion valve flow controller configured to adjust a flow of liquid refrigerant through a variable flow expansion valve based on an error of the heater injection signal relative to a nominal heater injection signal, and the compressor speed controller configured to adjust a speed of a compressor based on the heater injection signal error, wherein the heater injection signal serves as a proxy for DUT heat load changes, allowing the refrigeration sub-system to rapidly respond to variations in the DUT heat dissipation.

11. The apparatus of claim 10, wherein the compressor speed controller is further configured to dynamically adjust compressor speed based on variations in the heater injection signal error, wherein the adjustment reduces thermal oscillations and prevents compressor overloading.

12. The apparatus of claim 10, further comprising an evaporator superheat temperature sensor;
wherein the expansion valve flow controller includes a tuned feedback controller configured to receive an additional input from the evaporator superheat temperature sensor.

13. The apparatus of claim 10, further comprising a secondary evaporator superheat error signal;
wherein the expansion valve flow controller includes a tuned feedback controller configured to regulate refrigerant flow based on the heater injection signal error and the secondary evaporator superheat error signal.

14. The apparatus of claim 13, wherein the tuned feedback controller is a proportional-integral-derivative (PID) controller.

15. The apparatus of claim 10, wherein the compressor speed controller includes an adaptive filter configured to smooth transient fluctuations in compressor speed adjustments based on the heater injection signal error.

16. The apparatus of claim 10, further comprising a compressor suction inlet;
wherein the expansion valve flow controller is further configured to prevent liquid refrigerant from reaching the compressor suction inlet by adjusting flow based on a detected superheat threshold.

17. A method for regulating the temperature of a device under test (DUT), the method comprising:
receiving a measured temperature of the DUT and determining an error relative to a setpoint temperature;
generating, by a heater controller, a heater injection signal based on the determined temperature error;
adjusting, by an expansion valve flow controller, the flow of liquid refrigerant to a variable expansion valve based on an error of the heater injection signal relative to a nominal heater injection signal;
adjusting, by a compressor speed controller, a speed of a compressor based on the heater injection signal error; and
controlling the refrigeration sub-system to dynamically balance cooling and heating operations such that the heater remains within a nominal operating range, preventing temperature oscillations, evaporator flooding, and compressor overheating.

18. The method of claim 17, further comprising dynamically tuning the expansion valve flow controller to prioritize rapid response to DUT heat load changes while preventing excessive refrigerant flow.

19. The method of claim 17, wherein adjusting the speed of the compressor comprises applying an exponential smoothing function to filter noise from transient heater injection signal fluctuations.

20. The method of claim 17, further comprising regulating refrigerant flow by a tuned feedback controller based on the heater injection signal error and a secondary evaporator superheat error signal.

* * * * *